United States Patent
Suzuki et al.

(10) Patent No.: US 6,535,719 B1
(45) Date of Patent: Mar. 18, 2003

(54) FM TRANSMITTER

(75) Inventors: Tamotsu Suzuki, Kyoto (JP); Hiroyuki Ashida, Kyoto (JP); Masatoshi Tsuji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/496,932

(22) Filed: Feb. 2, 2000

(30) Foreign Application Priority Data

Feb. 5, 2000 (JP) .......................................... 11-028870

(51) Int. Cl.[7] .................................................. H04B 1/04
(52) U.S. Cl. ............................ 455/112; 455/76; 455/118
(58) Field of Search .................................. 455/110, 112, 455/118, 113, 92, 66, 63, 99, 345, 575, 816, 426, 480, 333, 84, 260, 73–76, 324, 85, 87, 317–318, 265; 381/14, 79, 7, 13, 106, 1–4, 5–10; 331/188, 34, 23; 332/117, 19; 375/295, 332, 303

(56) References Cited

U.S. PATENT DOCUMENTS

| 4,823,390 | A | * | 4/1989 | Wittrock | .......................... | 381/4 |
| 5,406,631 | A | * | 4/1995 | Takeda et al. | ................... | 381/4 |
| 5,771,441 | A | * | 6/1998 | Altstatt | .......................... | 455/66 |
| 5,953,640 | A | * | 9/1999 | Meador et al. | ................ | 455/73 |
| 5,970,390 | A | * | 10/1999 | Koga et al. | ..................... | 455/42 |
| 6,246,864 | B1 | * | 6/2001 | Koike | ........................... | 455/110 |

FOREIGN PATENT DOCUMENTS

| JP | 361161041 A | * | 7/1986 | ............ H04H/5/00 |
| JP | 408186445 A | * | 7/1996 | ............ H03C/3/09 |
| JP | 410013370 A | * | 1/1998 | ............ H04H/5/00 |

* cited by examiner

Primary Examiner—Thanh Cong Le
Assistant Examiner—Pablo Tran
(74) Attorney, Agent, or Firm—Hogan & Hartson, LLP

(57) ABSTRACT

A frequency modulating (FM) transmitter includes a reference frequency generator, a reference frequency divider, a stereo modulation circuit, an oscillator circuit, a program counter, and a PLL frequency synthesizer. The reference frequency generator is for generating a reference frequency. The reference frequency divider is for frequency dividing the reference frequency. The stereo modulation circuit is for frequency modulating audio signals by using one output of the reference frequency divider to supply resultant stereo modulated signals as FM signals. The oscillator circuit is for generating carrier waves to transmit the FM signals. The program counter is for frequency dividing the carrier waves into variable frequency components. The PLL frequency synthesizer has a phase comparator circuit for comparing the variable frequency components output from the program counter with another output of the reference frequency divider.

20 Claims, 2 Drawing Sheets

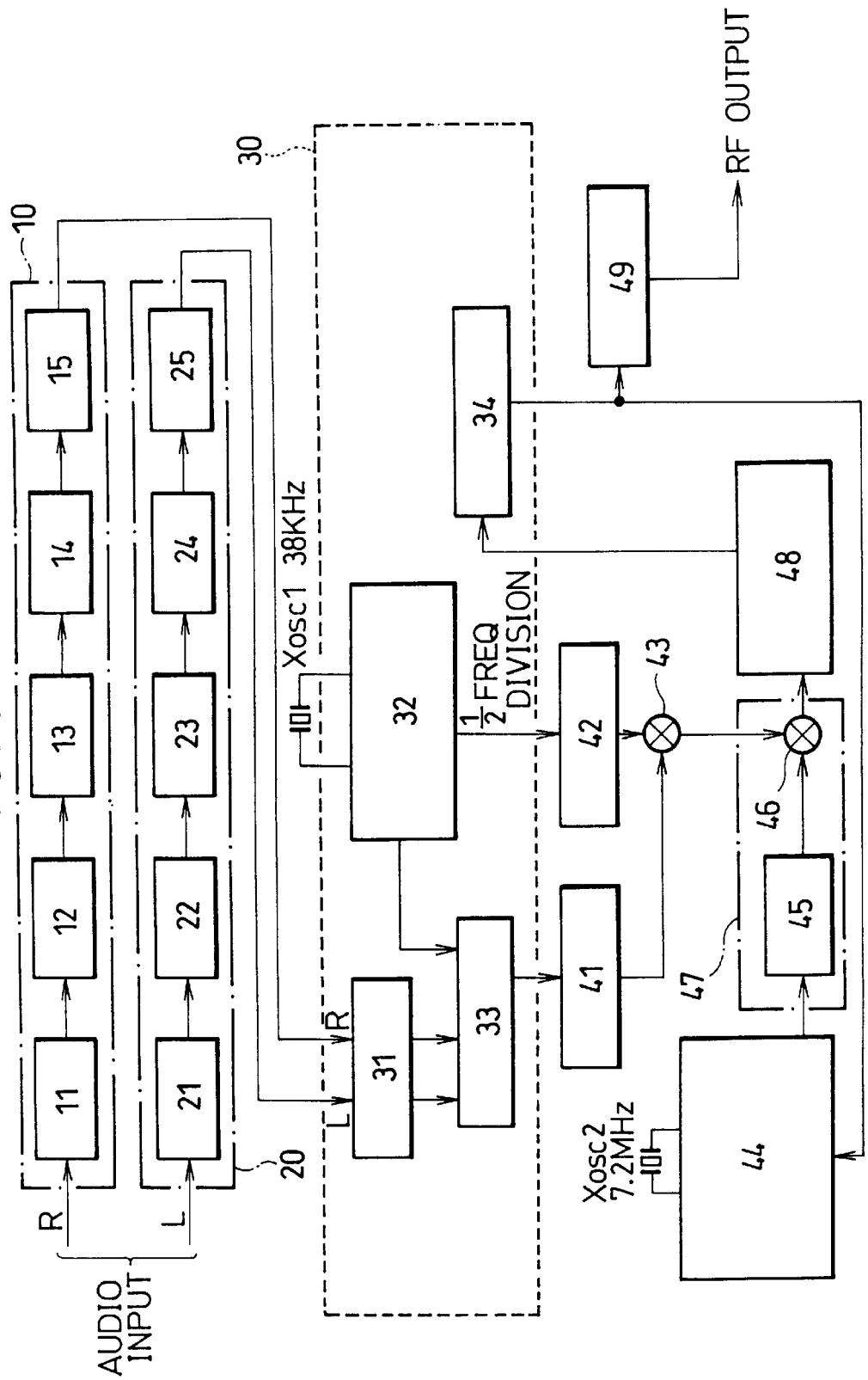

FM TRANSMITTER

FIELD OF THE INVENTION

The invention relates to a frequency modulation (FM) transmitter for radio transmission of frequency modulated stereo audio signals.

BACKGROUND OF THE INVENTION

FM transmitters for radio transmission of frequency modulated stereo audio signals have been used. A typical FM transmitter has an arrangement as shown in FIG. 2.

As seen in FIG. 2, the transmitter includes:

a right audio section 10 having a pre-emphasis circuit 11, a volume 12, a limiter 13, a low-pass filter 14, and a muting circuit 15;

a left audio section 20 having a pre-emphasis circuit 21, a volume 22, a limiter 23, a low-pass filter 24, and a muting circuit 25;

a stereo modulator section 30 having an audio amplifier 31 for amplifying audio signals received from the audio sections 10 and 20, an oscillator circuit 32 coupled with an external quartz oscillator Xosc1 (having a fundamental frequency of 38 kHz) to generate 38 kHz signals, a multiplexer 33 for switching between right and left amplified 38 kHz audio signals received from the oscillator circuit 32, and a radio frequency (RF) amplifier circuit 34;

a modulation level adjust circuit 41 for regulating the output level of the multiplexer 33;

a pilot level adjust 42 for regulating the level of 19 kHz pilot signal obtained by frequency dividing the 38 kHz output of the oscillator circuit 32;

a mixer circuit 43 for mixing the regulated output signals of the modulation level adjust circuit 41 with the output of the pilot level adjust circuit 42 to generate a composite signal;

a PLL frequency synthesizer 44 coupled to an external quartz oscillator Xosc2 (having a fundamental frequency of 7.2 MHz) and with the RF amplifier circuit 34 to receive the RF output thereof to generate a frequency control signal;

an oscillation control section 47 having a low-pass filter 45 for filtering the low frequency components of the output of the PLL frequency synthesizer 44;

a mixing circuit 46 for mixing the output of the PLL frequency synthesizer 44 with the composite signal received from the mixer circuit 43 to generate a frequency modulation signal;

a frequency modulation circuit 48 controlled by the output signal of the frequency control section 47; and an RF output level regulation circuit 49 for regulating the RF output of the RF amplifier circuit 34.

It is noted that the stereo modulator section 30 and the PLL synthesizer 44 are themselves provided in the form of integrated circuits. The PLL synthesizer 44 is represented by a single block in FIG. 2, but it actually comprises several components such as a frequency divider, a phase comparator, and program counter.

The PLL synthesizer 44 frequency divides the signal generated by the quartz oscillator Xosc2 (having 7.2 MHz) into several different frequencies and supplies its output to an input end of a phase comparator for use as reference frequency signals. The RF frequency signal generated by the oscillation modulator circuit 48 is also frequency divided by a program counter, which are supplied to the other input end of the phase comparator for comparison with the reference frequency signals. Upon comparison of the input signals, the phase comparator provides its outputs to the oscillation control section 47, which determines RF frequencies based on the frequency divided frequencies and the reference frequencies.

The PLL frequency synthesizer 44 is used to generate reference frequencies, for example, 100 kHz, 50 kHz, 25 kHz, 10 kHz, 9 kHz, 5 kHz, and 1 kHz for radio broadcasting. In this case, an appropriate external quartz oscillator Xosc2 is one having a fundamental frequency of 7.2 MHz.

As discussed above, prior art FM transmitters have been constructed as a composite of different types of elements such as audio sections 10 and 20, a stereo modulation section 30, a PLL frequency synthesizer 44, an oscillation controller 47, and a frequency modulation circuit 48. Of these, the stereo modulator 30 and the PLL frequency synthesizer 44 are formed into integrated circuits.

As a result, these components are arranged in a complex configuration and require complex wiring thereof when these elements are integrated to form an FM transmitter.

In addition, the stereo modulator section 30 and the PLL frequency synthesizer 44, built in the integrated circuit configurations, utilize different quartz oscillators Xosc1 and Xosc2 having different fundamental frequencies (38 kHz and 7.2 MHz), respectively, for their intended purposes. The use of such different quartz oscillators in one transmitter inevitably results in an extra manufacturing cost.

SUMMARY OF THE INVENTION

In accordance with one aspect of the invention, a frequency modulating (FM) transmitter includes:

a reference frequency generator for generating a reference frequency;

a reference frequency divider for frequency dividing the reference frequency;

a stereo modulation circuit for frequency modulating a right audio signal and a left audio signal by using one output of the reference frequency divider to supply resultant stereo modulated signals as FM radio signals;

an oscillator circuit for generating carrier waves to transmit the FM signals received from the stereo modulation circuit;

a program counter for frequency dividing the carrier waves into variable frequency components; and a PLL frequency synthesizer which has a phase comparator circuit for comparing the variable frequency components output from the program counter with another output of the reference frequency divider to provide at an output end of the PLL frequency synthesizer a control signal for controlling the oscillator circuit.

In this arrangement, since the FM transmitter may generate various frequency signals for both the stereo modulation and frequency comparison in the PLL frequency synthesizer by means of a single oscillator, the resulting FM transmitter has most of the elements integrated in one chip, which implies that the transmitter has far smaller dimensions and a simpler structure in number and arrangement of elements than conventional transmitters, and hence offers increased reliability and reduced manufacturing cost. Further, the program counter may be constructed such that the frequency division ratios of the program counter and the modulation level of the stereo modulator circuit are controllable by external means. It is then possible to vary the carrier frequency of the FM transmission wave as needed and to set the FM modulation at a characteristically optimum level.

The frequency of the reference frequency generator may be chosen to be 7.6 MHz or an integral multiple or fractional frequencies of 7.6 MHz obtained by dividing 7.6 MHz by integers (hereinafter referred to as integer fractions). It should be noted that this choice of the fundamental frequency allows provision of not only commonly used 38 kHz and 19 kHz Stereo modulation frequencies through the frequency divisions but also FM radio frequencies which are close to conventional frequencies by the same quartz oscillator.

In accordance with another aspect of the invention, a frequency modulating (FM) transmitter includes:

a reference frequency generator for generating a reference frequency;

a reference frequency divider for frequency dividing the reference frequency;

a stereo modulation circuit for frequency modulating audio signals by using one output of the reference frequency divider to supply resultant stereo modulated signals as FM signals;

an oscillator circuit for generating carrier waves to transmit the FM signals;

a program counter for frequency dividing the carrier waves into variable frequency components; and a PLL frequency synthesizer which has a phase comparator circuit for comparing the variable frequency components output from the program counter with another output of the reference frequency divider.

In accordance with another aspect of the invention, a method of generating an FM signal includes:

generating a reference frequency;

dividing the reference frequency using a reference frequency divider;

frequency modulating a right audio signal and a left audio signal using one output of the reference frequency divider to supply FM signals;

generating carrier waves to transmit the FM signals using an oscillator circuit;

dividing the carrier waves into variable frequency components; and comparing the variable frequency components with another output of the reference frequency divider using a phase comparator circuit in a PLL frequency synthesizer.

BRIEF DESCRIPTION OF THE DRAWINGS

The invention will now be described in detail by way of example with reference to accompanying drawings, in which:

FIG. 2 is a block diagram of a conventional FM transmitter.

DETAILED DESCRIPTION OF THE PREFERRED EMBODIMENTS

Figure 1:
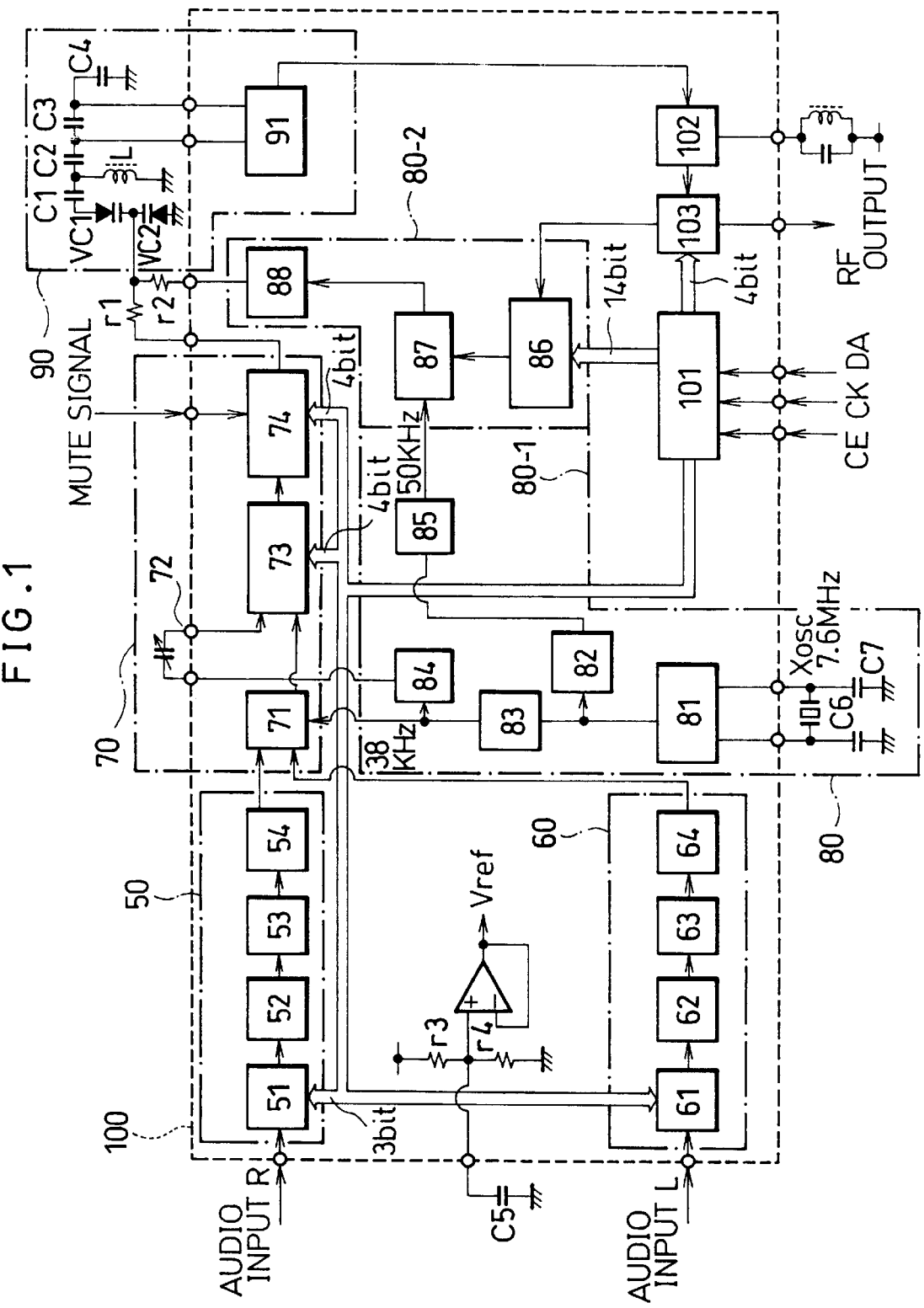
FIG. 1 is a block diagram of an FM transmitter according to the invention.

Referring to FIG. 1, there is shown an FM transmitter of the invention.

As shown in the FIG. 1, the FM transmitter has an integrated semiconductor circuit 100 including a main portion of the FM transmitter and external components such as a quartz oscillator Xosc.

It is seen from FIG. 1 that a right audio signal R input to an input terminal is passed to one input end of a multiplexer 71 through an audio circuit 50 which consists of a volume 51, a pre-emphasis circuit 52, a limiter 53, and a low-pass filter 54. Similarly, a left audio signal L is passed to the other input end of the multiplexer 71 through an audio circuit 60 which consists of a volume 61, a pre-emphasis circuit 62, a limiter 63, and a low-pass filter 64.

The two input signals supplied to the multiplexer 71 are alternately supplied to a stereo modulation level adjust circuit 73 by a 38 kHz subcarrier serving as a switching signal supplied by a reference frequency oscillator 80-1. The 38 kHz signal from the oscillator 80-1 is frequency divided into halves and passed through a variable capacitor 72 before it is supplied as a pilot signal to the stereo modulation level adjust circuit 73. The variable capacitor 72 is provided for frequency separation of the 19 kHz signal from the 34 kHz signal. In the stereo modulation level adjust circuit 73, both the 19 kHz pilot signal and the signal supplied from the multiplexer 71 are regulated in level. The output of the stereo modulation level adjust circuit 73 is then coupled to an FM modulation level adjust circuit 74, where the signal is regulated in level before it is output as FM modulated signal.

The FM modulation level adjust circuit 74 may cut off its output upon receipt of an external mute signal. The variable capacitor 72 may be adjusted so as to make the switching signal of the multiplexer 71 in phase with the 19 kHz pilot signal. The multiplexer 71, the variable capacitor 72, the stereo modulation level adjust circuit 73, and the FM modulation level adjust circuit 74 constitute a stereo modulation section 70.

A phase comparator section 80-2 receives at the reference frequency input terminal of a phase comparator circuit 87, a signal having a fixed frequency, 50 kHz for example, from the reference frequency oscillator 80-1. Unlike the modulation frequencies (38 kHz and 19 kHz) of the stereo modulation section 70, the frequency of the signal may be set to an appropriate frequency for the transmitter as needed, which is 50 kHz in this example. On the other hand, a radio transmission signal is provided to the program counter 86, where it is frequency divided by a prescribed frequency ratio set in the program counter 86. The resultant signals are supplied to an input terminal (referred to as frequency comparison terminal) of the phase comparison circuit 87 as a reference signal, for comparison (referred to as signal frequency comparison signal).

The phase comparison circuit 87 compares the phases of the two input signals and outputs an oscillation control signal via a low-pass filter 88. The program counter 86, phase comparison circuit 87, and low-pass filter 88 constitute the phase comparator 80-2.

In the reference frequency oscillator 80-1, the external quartz oscillator Xosc (having a fundamental frequency of 7.6 MHz) and capacitors C6 and C7 are connected to an oscillator circuit 81, which generates an output of 7.6 MHz. This frequency is further divided by a frequency divider 83 to 1/200 of 7.6 MHz, i.e. 38 kHz when the signal is supplied to the multiplexer 71, and to ½ of 7.6 MHz when it is supplied to the variable capacitor 72.

The signal is also divided in frequency to 1/76 by the frequency divider 82, and further to ½ by the frequency divider 85, and then supplied to the reference frequency terminal of the phase comparison circuit 87. It should be understood that the frequency division ratio set in the frequency divider 85 is not limited to ½. It may be set at an arbitrary ratio in connection with the frequency division ratios of the program counter 86.

Each of the frequency divider circuits 82–85 may be provided in the form of a T-shape flip-flop CMOS logic circuit, having exactly 50% duty cycle of a clock signal supplied thereto. Thus, the frequency range that the variable capacitor 72 must regulate in separating the two frequencies, can be small. It would be appreciated that the duty cycles are little affected by temperature, so that the modulator section has a desirable temperature characteristic. In effect, the modulator can be used without any temperature adjustment.

The quartz oscillator Xosc, capacitors C6 and C7, oscillator circuit 81, and the frequency dividers 82–85 constitute the reference frequency. oscillator section 80-1. The reference frequency oscillator section 80-1 and the phase comparator section 80-2 together constitute the PLL frequency synthesizer 80.

In this manner, the invention provides an improvement in FM transmitters, which utilizes only one quartz oscillator Xosc of 7.6 MHz, instead of two quartz oscillators as in a prior art transmitter with a first oscillator Xosc1 (quartz oscillator having a fundamental frequency of 38 kHz) for generating a reference frequency signal for stereo modulation, and a second quartz oscillator Xosc2 (quartz oscillator of a fundamental frequency of 7.2 MHz) for generating a reference frequency signal for phase comparison.

Thus, in order to make a single quartz oscillator usable in two ways as a generator of a reference frequency on one hand and as a generator of divisional frequency signals for stereo modulation on the other, the invention has overcome dedicated use of 38 kHz quartz oscillator as a reference frequency source. Instead, the invention utilizes the same quartz oscillator simultaneously as a source of different radio frequencies including 100 kHz, 50 kHz, 25 kHz, 10 kHz, 9 kHz, 5 kHz, and 1 kHz, by frequency dividing the fundamental frequency of the quartz oscillator. In view of the fact that a 7.6 MHz quartz oscillator has been used in generating the reference frequency, the invention obtains new radio frequencies which are derived advantageously from such frequency divisions of the fundamental frequency of 7.6 MHz. It is then possible to provide, in addition to the fundamental frequency of 7.6 MHz itself, such integer fractions derived from the fundamental frequency of 7.6 MHz as 1.9 MHz, 3.8 MHz, 15.2 MHz, and 22.8 MHz, for example.

The modulation signal from the stereo modulation section 70 and the oscillation control signal from the phase comparison section 80-2 are supplied to a frequency modulation (FM) circuit 90 via a resistor r1 and via a resistor r2, respectively. The FM circuit 90 generates a radio-frequency (RF) signal in accordance with these signals. The RF signal is then passed to RF amplifiers 102 and 103 for amplification thereof before it is transmitted as an RF output signal. The FM circuit 90, adapted to generate frequency modulated RF signals, comprises a variable capacitors Vc1 and Vc2, capacitors C1–C4, a reactor L, and a transistorized oscillator circuit 91.

Upon receipt of a tip enable signal CE, a clock signal CK, and control data DA, a shift register 101 provides digital control signals or digital instruction signals to volumes 51 and 61, stereo modulation level adjust circuits 73 and 74, program counter 86, and RF amplifier circuit 103. A reference voltage Vref is formed by resistors r3 and r4, capacitor C5, and an operational amplifier OP1.

It would be understood that although the resistors r1 and r2, capacitors C5, C6, and C7.are shown in FIG. 1 to be external elements, they could be built-in in the integrated semiconductor circuit 100 of the FM transmitter. It would be also understood that terminals for connection with a power supply and ground (not shown) may be provided as needed.

In the FM transmitter of the invention, all the components except for the quartz oscillator Xosc and the modulation elements, are integrated in a single semiconductor chip. The chip may be formed by BiCMOS processes. Analog signal processor sections 50 and 60, stereo modulation section 70, FM circuit 90, and RF amplifiers 102 and 103 may be provided in the form of bipolar circuits. PLL frequency synthesizer 80, which is a digital or pulse signal processor, and shift register 101 may be CMOS circuits.

As described above, the invention avoids the use of two independent quartz oscillators for stereo modulation and for PLL frequency synthesizer. Instead, the invention employs a single oscillator, from which not only the 38 kHz and 19 kHz stereo modulation frequencies but also a set of different fractional frequencies for the PLL frequency synthesizer are derived. Accordingly, by choosing the fundamental frequency of the PLL frequency synthesizer at 7.6 MHz (or alternatively an integral multiple of 7.6 MHz, or fractional frequencies obtained by dividing 7.6 MHz by integers) only a single quartz oscillator may suffice as a generator of different frequencies.

Because most of the components of the FM transmitter are integrated in the form of a single semiconductor device, except for such external components as a quartz oscillator Xosc and oscillator modulation elements Vc1 and Vc2, the FM transmitter of the invention has a greatly reduce number of components arranged in a neat and compact configuration and hence has a high reliability.

In addition, the device as a whole may be integrated in the form of BiCMOS circuit having analog components and digital components in separate regions. The analog components such as audio sections 50 and 60, stereo modulator 70, oscillator modulator circuit 90, and RF amplifiers 102 and 103 can be bipolar circuits, while digital components such as PLL frequency synthesizer 80, and shift register 101 can be CMOS circuits so that they are formed in their most appropriate configurations.

What we claim is:

1. A frequency modulating (FM) transmitter, comprising:

a reference frequency generator for generating a reference frequency;

a reference frequency divider for frequency dividing said reference frequency;

a stereo modulation circuit for frequency modulating a right audio signal and a left audio signal by using one output of said reference frequency divider to supply resultant stereo modulated signals as FM signals;

an oscillator circuit for generating carrier waves to transmit said FM signals received from said stereo modulation circuit;

a program counter for frequency dividing said carrier waves into variable frequency components; and a PLL frequency synthesizer which has a phase comparator circuit for comparing said variable frequency components output from said program counter with another output of said reference frequency divider to provide at an output end of said PLL frequency synthesizer a control signal for controlling said oscillator circuit.

2. The FM transmitter according to claim 1, wherein frequency division ratios of said program counter and modulation level of said stereo modulation circuit are externally controllable.

3. The FM transmitter according to claim 1, wherein said reference frequency from said reference frequency generator is selected from the group consisting of 7.6 MHz, an integral multiple of 7.6 MHz, and integer fractions of 7.6 MHz.

4. The FM transmitter according to claim 1, wherein said reference frequency generator, said reference frequency divider, said stereo modulation circuit, said oscillator circuit, said program counter, and said PLL frequency synthesizer are included in a single integrated semiconductor circuit.

5. The FM transmitter according to claim 4, wherein said single integrated semiconductor circuit is a BiCMOS circuit.

6. The FM transmitter according to claim 1, wherein said reference frequency generator is a single quartz oscillator.

7. The FM transmitter according to claim 1, further comprising:
- a left audio circuit coupled to said stereo modulation circuit for outputting said left audio signal based on a left audio input signal; and
- a right audio circuit coupled to said stereo modulation circuit for outputting said right audio signal based on a right audio input signal.

8. The FM transmitter according to claim 7, wherein said left audio circuit and said right audio circuit include a volume circuit, a pre-emphasis circuit, a limiter, and a low-pass filter.

9. The FM transmitter according to claim 1, wherein an external mute signal is applied to said stereo modulation circuit for cutting off said resultant stereo modulated signals.

10. The FM transmitter according to claim 1, wherein said reference frequency divider comprises a T-shape flip-flop CMOS logic circuit.

11. The FM transmitter according to claim 1, wherein said output of said reference frequency divider and said another output of said reference frequency divider are selected from the group consisting of 100 kHz, 50 kHz, 25 kHz, 10 kHz, 9 kHz, 5 kHz, and 1 kHz.

12. The FM transmitter according to claim 1, further comprising at least one RF amplifier for amplifying said FM signals before transmission.

13. The FM transmitter according to claim 1, wherein said stereo modulation circuit is a bipolar circuit.

14. The FM transmitter according to claim 1, wherein said PLL frequency synthesizer is a CMOS circuit.

15. The FM transmitter according to claim 1, wherein said stereo modulator circuit comprises:
- a multiplexer;
- a stereo modulation level adjust circuit coupled to said multiplexer;
- a variable capacitor coupled between said multiplexer and said stereo modulation level adjust circuit; and
- an FM modulation level adjust circuit coupled to said stereo modulation level adjust circuit.

16. A frequency modulating (FM) transmitter, comprising:
- a reference frequency generator for generating a reference frequency;
- a reference frequency divider for frequency dividing said reference frequency;
- a stereo modulation circuit for frequency modulating audio signals by using one output of said reference frequency divider to supply resultant stereo modulated signals as FM signals;
- an oscillator circuit for generating carrier waves to transmit said FM signals;
- a program counter for frequency dividing said carrier waves into variable frequency components; and
- a PLL frequency synthesizer which has a phase comparator circuit for comparing said variable frequency components output from said program counter with another output of said reference frequency divider.

17. The FM transmitter according to claim 16, wherein frequency division ratios of said program counter and modulation level of said stereo modulation circuit are externally controllable.

18. The FM transmitter according to claim 16, wherein said reference frequency from said reference frequency generator is selected from the group consisting of 7.6 MHz, an integral multiple of 7.6 MHz, and integer fractions of 7.6 MHz.

19. The FM transmitter according to claim 16, wherein said reference frequency generator, said reference frequency divider, said stereo modulation circuit, said oscillator circuit, said program counter, and said PLL frequency synthesizer are included in a single integrated semiconductor circuit.

20. A method of generating an FM signal, comprising:
- generating a reference frequency;
- dividing said reference frequency using a reference frequency divider;
- frequency modulating a right audio signal and a left audio signal using one output of said reference frequency divider to supply FM signals;
- generating carrier waves to transmit said FM signals using an oscillator circuit;
- dividing said carrier waves into variable frequency components; and
- comparing said variable frequency components with another output of said reference frequency divider using a phase comparator circuit in a PLL frequency synthesizer.

\* \* \* \* \*

(12) EX PARTE REEXAMINATION CERTIFICATE (8214th)
United States Patent
Suzuki et al.

(10) Number: US 6,535,719 C1
(45) Certificate Issued: May 10, 2011

(54) FM TRANSMITTER

(75) Inventors: Tamotsu Suzuki, Kyoto (JP); Hiroyuki Ashida, Kyoto (JP); Masatoshi Tsuji, Kyoto (JP)

(73) Assignee: Rohm Co., Ltd., Ukyo-Ku, Kyoto (JP)

Reexamination Request:
No. 90/008,754, Jul. 17, 2007

Reexamination Certificate for:
Patent No.: 6,535,719
Issued: Mar. 18, 2003
Appl. No.: 09/496,932
Filed: Feb. 2, 2000

(30) Foreign Application Priority Data

Feb. 5, 2000 (JP) .......................... 11-028870

(51) Int. Cl.
*H04B 1/04* (2006.01)

(52) U.S. Cl. .......................... 455/112; 455/76; 455/118
(58) Field of Classification Search ..................... None
See application file for complete search history.

(56) References Cited

U.S. PATENT DOCUMENTS

| | | | |
|---|---|---|---|
| 3,902,019 A | 8/1975 | Bruene | |
| 5,771,441 A | 6/1998 | Altstatt | |

FOREIGN PATENT DOCUMENTS

| | | | |
|---|---|---|---|
| JP | 02-291161 A | 11/1990 | |
| JP | 6-132702 A | 5/1994 | |
| JP | 6-261012 A | 9/1994 | |
| JP | 7-6992 U | 1/1995 | |
| JP | 9-321720 A | 12/1997 | |
| JP | 09-321720 | * 12/1997 | |
| JP | 2000-228635 A | 8/2000 | |

* cited by examiner

*Primary Examiner*—Minh T Nguyen

(57) ABSTRACT

A frequency modulating (FM) transmitter includes a reference frequency generator, a reference frequency divider, a stereo modulation circuit, an oscillator circuit, a program counter, and a PLL frequency synthesizer. The reference frequency generator is for generating a reference frequency. The reference frequency divider is for frequency dividing the reference frequency. The stereo modulation circuit is for frequency modulating audio signals by using one output of the reference frequency divider to supply resultant stereo modulated signals as FM signals. The oscillator circuit is for generating carrier waves to transmit the FM signals. The program counter is for frequency dividing the carrier waves into variable frequency components. The PLL frequency synthesizer has a phase comparator circuit for comparing the variable frequency components output from the program counter with another output of the reference frequency divider.

At the time of issuance and publication of this certificate, the patent remains subject to pending reissue application number 12/961,384 filed 12/6/2010. The claim content of the patent may be subsequently revised if a reissue patent issues from the reissue application.

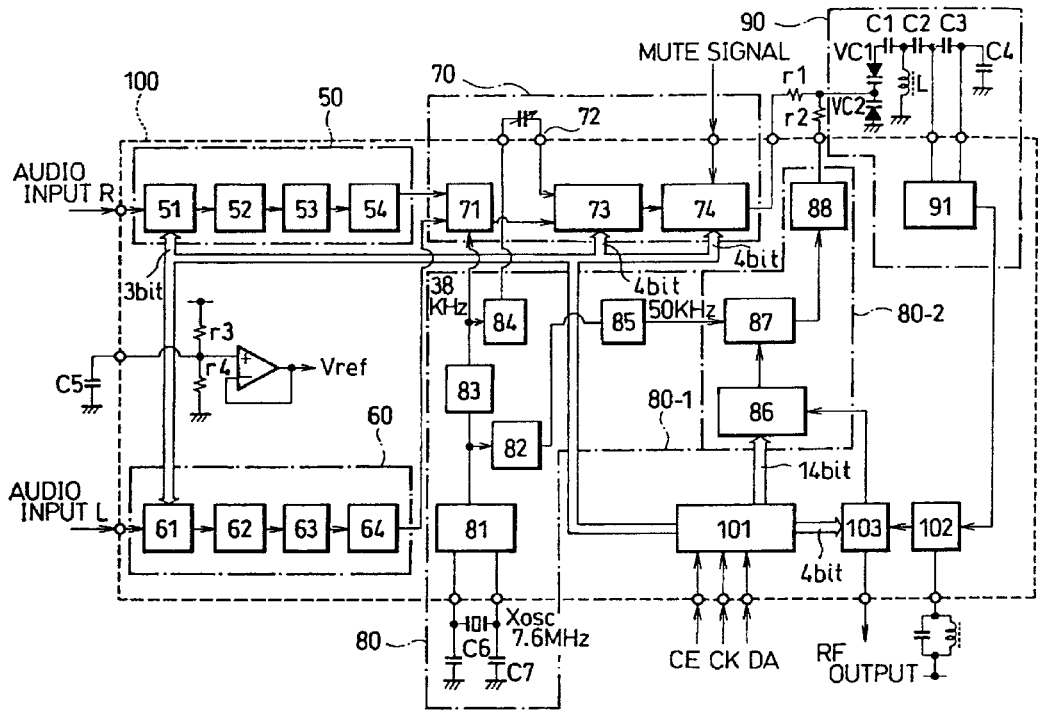

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 4, 6, 11, 16, 19 and 20 are cancelled.

Claims 2, 3, 5, 7-10, 12-15, 17 and 18 were not reexamined.

\* \* \* \* \*